Nov. 11, 1941.                B. W. SINCLAIR                2,262,302
                              BACON SKILLET
                           Filed May 6, 1940

INVENTOR.
Bentley W. Sinclair
BY A.B. Bowman
ATTORNEY.

Patented Nov. 11, 1941

2,262,302

UNITED STATES PATENT OFFICE 2,262,302

BACON SKILLET

Bently W. Sinclair, San Diego, Calif.

Application May 6, 1940, Serial No. 333,610

6 Claims. (Cl. 53—7)

My invention relates to a bacon skillet, more particularly adapted for use in frying bacon wherein the bacon remains intact from the mass of grease rendered and drained therefrom in said skillet and the objects of my invention are:

First, to provide a bacon skillet of this class in which the grease rendered from frying bacon therein drains away from the bacon reducing the curling tendency of the bacon to a minimum;

Second, to provide a bacon skillet of this class which is provided with a relatively large area grease retaining recess and spout portions communicating therewith for readily pouring the grease from said recess of my skillet;

Third, to provide a skillet of this class in which both sides thereof may be used for frying or cooking various foods;

Fourth, to provide a skillet of this class which may be used for baking pancakes or the like on either side thereof;

Fifth, to provide a skillet of this class which is provided with protruding outline portions on both sides for confining an open flame when either side of the skillet is placed thereover;

Sixth, to provide a skillet of this class which is very easy to keep clean and which is quickly heated when placed over a heating element;

Seventh, to provide a skillet of this class which effectively outlines an open flame thereunder and prevents said open flame from igniting grease in my skillet;

Eighth, to provide a skillet of this class which is reversable and may be used either side up for various purposes; and Ninth, to provide a skillet of this class which is very simple and economical of construction, efficient, durable and which will not readily deteriorate or get out of order.

Figure 1:
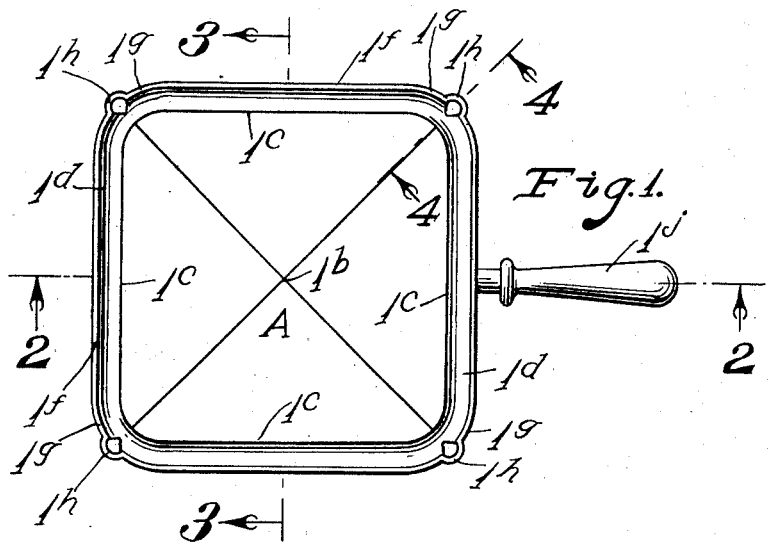
Figure 2:
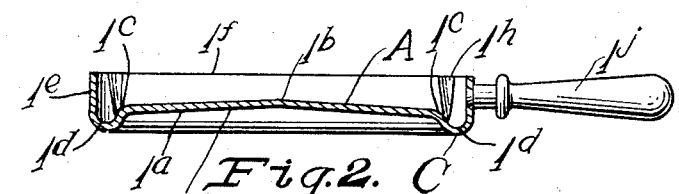
Figure 3:
Figure 4:
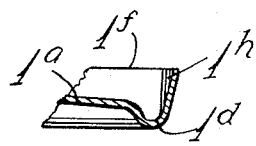

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part in this application in which:

Figure 1 is a top or plan view of my bacon skillet; Fig. 2 is a sectional view thereof taken from the line 2—2 of Fig. 1 showing parts in elevation to facilitate the illustration; Fig. 3 is a sectional view taken from the line 3—3 of Fig. 1 and Fig. 4 is a fragmentary sectional view taken from the line 4—4 of Fig. 1.

Similar characters of reference, refer to similar parts and portions throughout the several views of the drawing:

In the construction of my bacon skillet, I have provided a skillet with a bottom portion $1a$ which is inclined from its side edge portions $1c$ to a central portion $1b$, as shown best in Figs. 1 and 2 of the drawing. It will be noted that this bottom portion $1a$, as shown in Figs. 2 and 3 of the drawing is inclined inwardly and upwardly from the side edge portions $1c$ thereof and that the side edge portions $1c$ of the bottom portion $1a$ are surrounded by the recessed portion $1d$ which is arranged to retain the bacon grease rendered from the bacon when frying and drain outwardly and downwardly from the central portion $1b$ into said recess portion $1d$, as shown best in Figs. 2 and 3 of the drawing. Extending upwardly from the recessed portion $1d$ is a side portion $1e$ which surrounds and outlines the recessed portion $1d$ of my bacon skillet. The upper edge portion $1f$ of the side portion $1e$ is positioned above the central portion $1b$ of the bottom portion $1a$, as shown best in Figs. 2 and 3 of the drawing. The outline of my bacon skillet is preferably substantially square except that the side edge portion $1e$ and the recessed portion $1d$ are curved at the corner portions $1g$, as shown best in Fig. 1 of the drawing. Positioned in the side portion $1e$ at the corner portions $1g$ thereof are spout portions $1h$, as shown best in Figs. 1 and 4 of the drawing. These spout portions $1h$ are arranged for use in pouring grease outwardly from the recessed portion $1d$ with which said spout portions $1h$ communicate, as shown best in Fig. 4 of the drawing. Secured in the side portion $1e$ at one side of my skillet is the handle member $1j$ which is arranged for use in the conventional manner.

It will be here noted that the upper side A of the bottom portion $1a$ of my skillet is arranged for use in frying bacon thereon and that the lower side B of the bottom portion $1a$ of my skillet may be used for baking pancakes or the like thereon. It is to be noted, however, that either side may be used for any purpose desired.

When the bacon skillet is used for frying bacon and the lower side B of the bottom portion $1a$ is placed over a gas flame, the recessed portion $1d$ at its lower side C forms a surrounding outline for the gas flame over which it is placed.

When baking pancakes or the like on my skillet, with the lower side B of the bottom portion $1a$ inverted, an edge portion 1f forms an outline for the gas flame over which the skillet is placed. It will be noted that this edge portion 1f and the side C of the recess portion 1d are arranged to retain the heat under the bottom portion 1a when using my skillet and heating the same over various types of heating elements.

When frying bacon over an open flame, it is desired to catch the flame and prevent it from igniting the grease in the recessed portion 1d. To this end I have designed my bacon skillet so that the recess portion 1d forms an outline for the open flame and prevents it from passing upwardly over the side portions 1e and the edge portion 1f and igniting the grease in the recess portion 1d.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a bacon skillet of the class described, the combination of a skillet member provided with a bottom portion with flat sections inclined upwardly from its side edges to its central portion and a recessed portion surrounding the side edges of said bottom portion.

2. In a bacon skillet of the class described, the combination of a skillet member provided with a bottom portion with flat sections inclined upwardly from its side edges to its central portion, a recessed portion surrounding the side edges of said bottom portion, and side portions extending upwardly from the outer edge of said recessed portion surrounding said recessed portion and above said central portion.

3. In a bacon skillet of the class described, the combination of a skillet member provided with a bottom portion with flat sections inclined upwardly from its side edges to its central portion, a recessed portion surrounding the side edges of said bottom portion, side portions extending upwardly from the outer edge of said recessed portion surrounding said recessed portion and above said central portion, said bottom portion, recessed portions and side portions provided with arcuate corner portions.

4. In a bacon skillet of the class described, the combination of a skillet member provided with a bottom portion with flat portions inclined upwardly from its side edges to its central portion, a recessed portion surrounding the side edges of said bottom portion, side portions extending upwardly from the outer edge of said recessed portion surrounding said recessed portion and above said central portion, said bottom portion, recessed portions and side portions provided with arcuate corner portions and spout portions in said side portions at the arcuate corner portions thereof communicating with said recessed portion.

5. In a bacon skillet of the class described, the combination of a skillet member provided with a square bottom portion including a plurality of flat sections declining from its middle portion toward its outer edges and a recessed portion surrounding said bottom portion.

6. In a bacon skillet of the class described, the combination of a skillet member provided with a square bottom portion including a plurality of flat sections declining from its middle portion toward its outer edges, a recessed portion surrounding said bottom portion, and a side portion surrounding said recessed portion and extending upwardly therefrom.

BENTLY W. SINCLAIR.